United States Patent
Kim et al.

(10) Patent No.: US 11,287,385 B2
(45) Date of Patent: Mar. 29, 2022

(54) COMPOSITE PARTICLES HAVING NANOGAP, AND PREPARATION METHOD THEREFOR

(71) Applicants: INDUSTRY-UNIVERSITY COOPERATION FOUNDATION HANYANG UNIVERSITY ERICA CAMPUS, Ansan-Si (KR); SEOUL NATIONAL UNIVERSITY R & DB FOUNDATION, Seoul (KR)

(72) Inventors: Jong-Ho Kim, Ansan-si (KR); Yoon-Sik Lee, Seoul (KR); Jin-Kyoung Yang, Ansan-si (KR)

(73) Assignees: INDUSTRY-UNIVERSITY COOPERATION FOUNDATION HANYANG UNIVERSITY ERICA CAMPUS, Ansan-Si (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 0 days.

(21) Appl. No.: 16/649,180

(22) PCT Filed: Sep. 20, 2018

(86) PCT No.: PCT/KR2018/011103
§ 371 (c)(1),
(2) Date: Mar. 20, 2020

(87) PCT Pub. No.: WO2019/059663
PCT Pub. Date: Mar. 28, 2019

(65) Prior Publication Data
US 2020/0217797 A1 Jul. 9, 2020

(30) Foreign Application Priority Data
Sep. 20, 2017 (KR) ........................ 10-2017-0121068

(51) Int. Cl.
*A61B 8/00* (2006.01)
*C08K 9/06* (2006.01)
(Continued)

(52) U.S. Cl.
CPC ......... *G01N 21/658* (2013.01); *C09C 1/3054* (2013.01); *C09C 1/3063* (2013.01)

(58) Field of Classification Search
None
See application file for complete search history.

(56) References Cited

U.S. PATENT DOCUMENTS 5,853,464 A * 12/1998 Macpherson ............ B41M 3/14
    106/31.6
9,243,141 B1   1/2016 Farrugia et al.
(Continued)

FOREIGN PATENT DOCUMENTS

JP        201689163      5/2016
KR     1020120089928     1/2013
(Continued)

OTHER PUBLICATIONS

Kang et al., "Base Effects on Fabrication of Silver Nanoparticles Embedded Silica Nanocomposite for Surface-Enhanced Raman Scattering (SERS)", Journal of Nanoscience and Nanotechnology, vol. 11, pp. 579-583 (2011).

*Primary Examiner* — Alexandre F Ferre
(74) *Attorney, Agent, or Firm* — Finch & Maloney PLLC (57) ABSTRACT

Composite particles are provided. The composite particles can comprise: a base particle; a metal layer encompassing the base particle and having a surface on which a plurality of gaps are formed; and markers provided on the metal layer and also provided within the plurality of gaps of the metal layer.

12 Claims, 12 Drawing Sheets

(51) Int. Cl.
    *C08K 9/02*     (2006.01)
    *H04R 17/00*     (2006.01)
    *G01N 21/65*     (2006.01)
    *C09C 1/30*     (2006.01)

(56) References Cited

U.S. PATENT DOCUMENTS

| | | |
|---|---|---|
| 9,341,590 B2 | 5/2016 | Kim et al. |
| 9,797,842 B2 | 10/2017 | Tokonami et al. |
| 10,422,752 B2 | 9/2019 | Kim et al. |
| 2016/0146737 A1 | 5/2016 | Kim et al. |

FOREIGN PATENT DOCUMENTS

| | | |
|---|---|---|
| KR | 101545989 | 8/2015 |
| KR | 1020150044280 | 11/2015 |
| KR | 1020150101743 | 11/2015 |
| KR | 1020150097039 | 12/2015 |
| KR | 1020160037149 | 10/2016 |
| WO | 2012077756 A1 | 6/2012 |

\* cited by examiner

COMPOSITE PARTICLES HAVING NANOGAP, AND PREPARATION METHOD THEREFOR

TECHNICAL FIELD

The present invention relates to a composite particle having a nanogap and a method for preparing the same, and more particularly to a composite particle including a metal layer having a surface on which a plurality of gaps are formed; and a marker provided within the plurality of gaps.

BACKGROUND ART

Materials are applied to various fields such as automobiles, home appliances, construction, etc., and serve as a core element which has a decisive influence on the quality, performance, price, etc., of products. Various new materials have been used in many fields of daily life, such as cosmetics, clothes, sports equipment, paint, packaging, food, etc. These new materials have been now expanding the scope of their applications to the fields of advanced technology such as information technology (IT), biotechnology (BT) and environmental technology (ET).

In particular, various materials have been developed to improve the sensitivity and reliability of sensors.

For example, Korean Patent Registration Publication No. 10-1565652 discloses a biosensor that has high sensitivity and selectivity to a target material by using a direct binding between graphene oxide and the target material as an electrochemical marker, thereby making it easy to analyze a concentration of the target material.

DISCLOSURE

Technical Problem

One technical object of the present invention is to provide a high-reliable composite particle and a method for preparing the same.

Another technical object of the present invention is to provide a composite particle with improved signal stability and a method for preparing the same.

Still another technical object of the present invention is to provide a composite particle with improved signal sensitivity and a method for preparing the same.

Still another technical object of the present invention is to provide a composite particle for a surface-enhanced Raman scattering (SERS) sensor probe and a method for preparing the same.

Still another technical object of the present invention is to provide a composite particle for biomaterial detection, bioimaging and harmful material detection, and a method for preparing the same.

The technical objects of the present invention are not limited to the above.

Technical Solution

To solve the technical objects above, the present invention provides a composite particle.

According to one embodiment, the composite particle may include a base particle, a metal layer encompassing the base particle and having a surface on which a plurality of gaps are formed, and a marker provided on the metal layer and provided within the plurality of gaps of the metal layer.

According to one embodiment, the metal layer may include a plurality of convex portions protruding from a surface of the base particle, and the plurality of gaps may extend toward the surface of the base particle between the plurality of convex portions.

According to one embodiment, the marker may include a Raman marker.

According to one embodiment, the metal layer may include silver.

According to one embodiment, the base particle may include a silica particle.

According to one embodiment, the plurality of gaps may be narrowed as the gaps are close to the surface of the base particle.

To solve the technical objects above, the present invention provides a method for preparing a composite particle.

According to one embodiment, the method for preparing a composite particle may include preparing a precursor solution containing metal, and a base particle, mixing the precursor solution and the base particle to prepare a mixed solution, adding a reducing agent into the mixed solution, and adding a source of a marker into the mixed solution, to which the reducing agent is added, and stirring the resultant solution to prepare a composite particle, in which the composite particle may include the base particle, a metal layer encompassing the base particle and including the metal, and the marker provided on the metal layer.

According to one embodiment, the metal layer may include a plurality of convex portions protruding from a surface of the base particle, a plurality of gaps may be provided between the plurality of convex portions, and the marker may be provided within the plurality of gaps.

According to one embodiment, the preparing of the mixed solution may include mixing the precursor solution and the base particle with a dispersion stabilizer and the marker.

According to one embodiment, a size and number of the plurality of convex portions may be controlled depending on a content of the dispersion stabilizer.

According to one embodiment, if the content of the dispersion stabilizer is increased, the size of the plurality of convex portions may be decreased and the number of the plurality of convex portions may be increased, so as to increase the number of the plurality of gaps provided between the plurality of convex portions.

According to one embodiment, the number of the plurality of gaps may be controlled depending on a type of the marker.

According to one embodiment, the dispersion stabilizer may include PVP.

According to one embodiment, the base particle may have a functional group which is provided on the surface of the base particle and reacts with the metal.

Advantageous Effects

According to an embodiment of the present invention, a composite particle may be prepared by a method of adding a reducing agent and a source of a marker into a mixed solution, in which a precursor solution containing metal, and a base particle are mixed, and stirring the resultant solution. The composite particle may include the base particle, a metal layer encompassing the base particle, and a marker provided within a plurality of gaps formed on a surface of the metal layer. The marker may be provided within the plurality of gaps on the metal layer to enhance signal intensity and stability of the composite particle.

MODE FOR INVENTION

Hereinafter, preferred embodiments of the present invention will be described in detail with reference to the accompanying drawings. However, the technical spirit of the present invention is not limited to the embodiments, but may be realized in different forms. The embodiments introduced herein are provided to sufficiently deliver the spirit of the present invention to those skilled in the art so that the disclosed contents may become thorough and complete.

When it is mentioned in the specification that one element is on another element, it means that the first element may be directly formed on the second element or a third element may be interposed between the first element and the second element. Further, in the drawings, the thicknesses of the membrane and areas are exaggerated for efficient description of the technical contents.

Further, in the various embodiments of the present invention, the terms such as first, second, and third are used to describe various elements, but the elements are not limited to the terms. The terms are used only to distinguish one element from another element. Accordingly, an element mentioned as a first element in one embodiment may be mentioned as a second element in another embodiment. The embodiments illustrated here include their complementary embodiments. Further, the term "and/or" in the specification is used to include at least one of the elements enumerated in the specification.

In the specification, the terms of a singular form may include plural forms unless otherwise specified. Further, the terms "including" and "having" are used to designate that the features, the numbers, the steps, the elements, or combination thereof described in the specification are present, and may be understood that one or more other features, numbers, step, elements, or combinations thereof may be added. In addition, the term "connection" used herein may include the meaning of indirectly connecting a plurality of components, and directly connecting a plurality of components.

Further, in the following description of the present invention, a detailed description of known functions and configurations incorporated herein will be omitted when it may make the subject matter of the present invention unnecessarily unclear.

Figure 1:
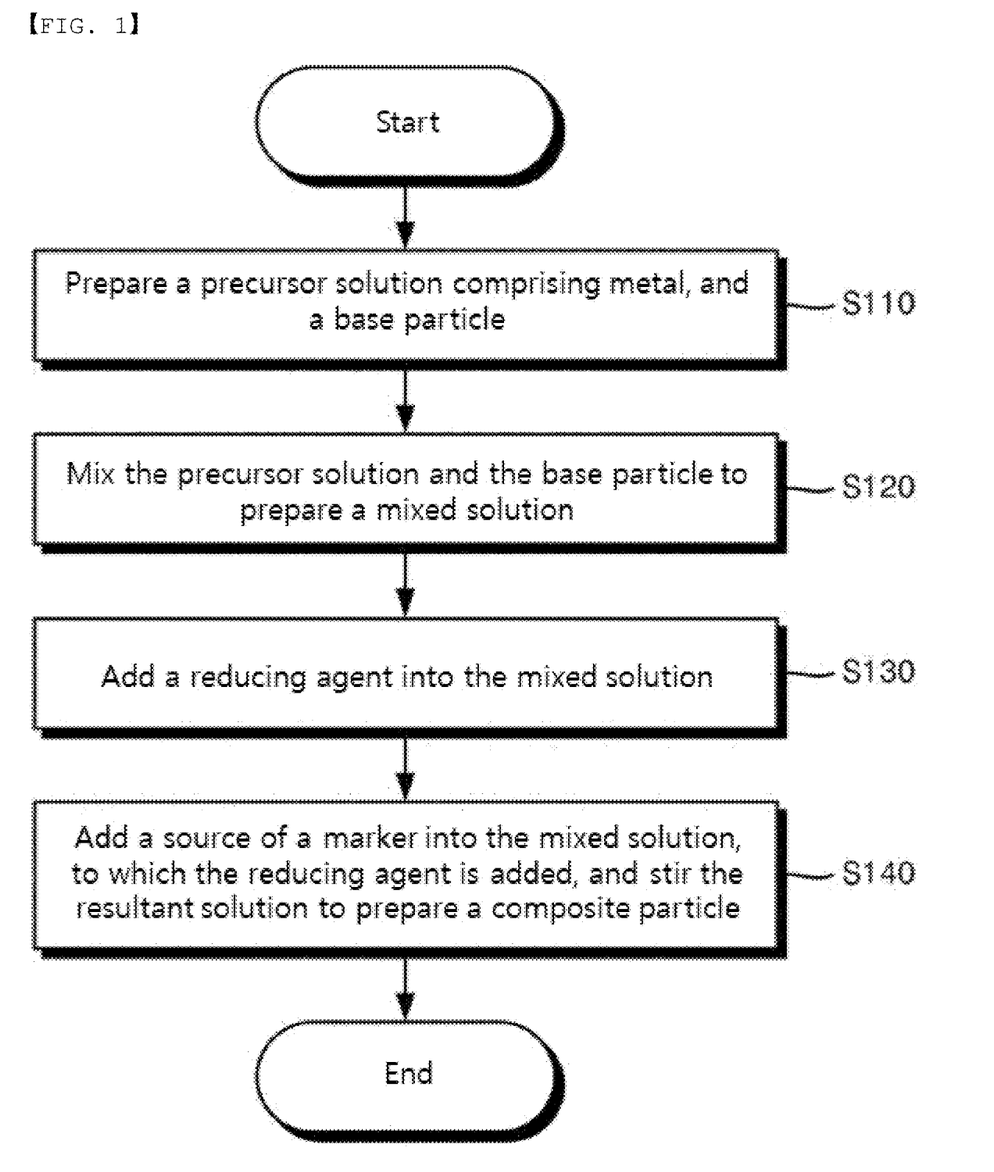
FIG. 1 is a flowchart for explaining a method for preparing a composite particle according to an embodiment of the present invention.
Figure 2:
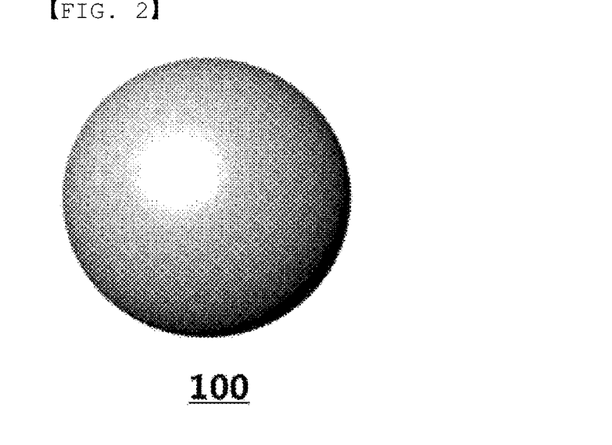
FIGS. 2 to 4 are views for explaining a composite particle according to an embodiment of the present invention and a method for preparing the same.
Figure 3:
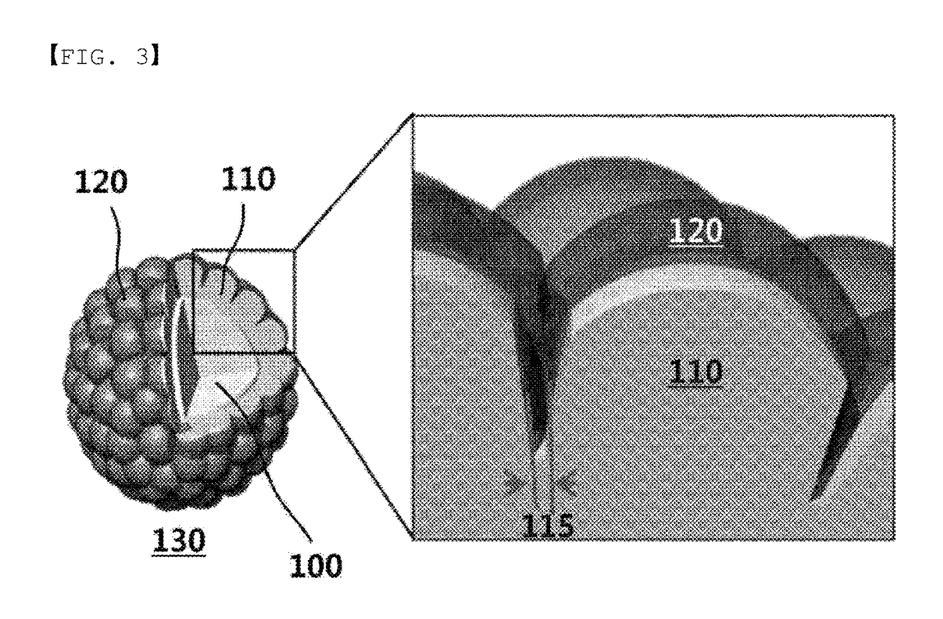
Figure 4:
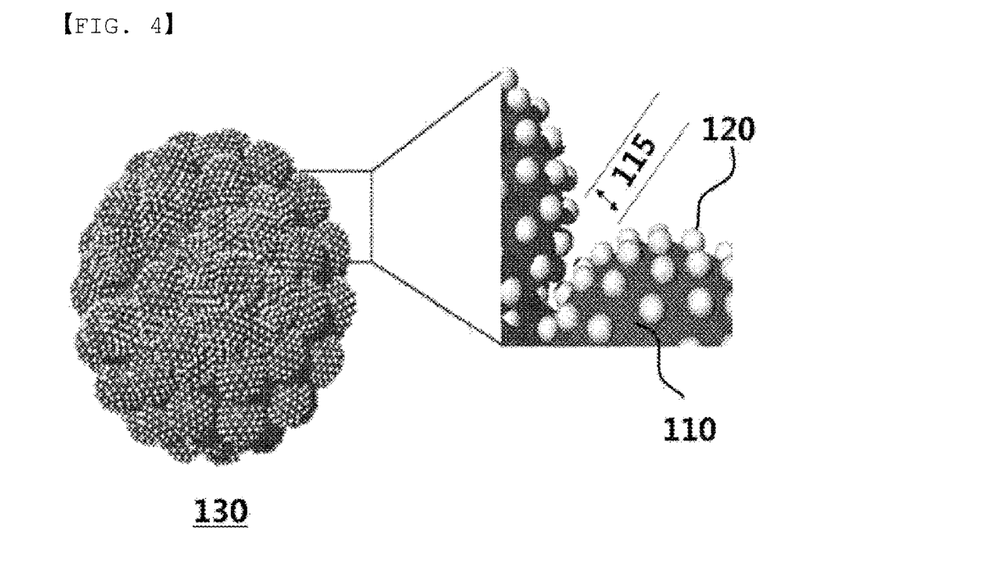

FIG. 1 is a flow chart for explaining a method for preparing a composite particle according to an embodiment of the present invention, and FIGS. 2 to 4 are views for explaining a composite particle according to an embodiment of the present invention and a method for preparing the same.

Referring to FIGS. 1 to 4, a precursor solution containing metal, and a base particle 100 may be prepared (S100).

According to one embodiment, the metal contained in the precursor solution may include silver (Ag). In this case, the precursor solution may include a solution in which $AgNO_3$ is dissolved in ethylene glycol. In contrast, the metal contained in the precursor solution may include at least one of silver and gold. Further, according to one embodiment, the precursor solution may contain at least two metal elements.

According to one embodiment, the base particle 100 may include a silica particle. In this case, the base particle 100 may be formed by a method of dissolving a silicon precursor in a solvent, adding a reducing agent therein, and stirring the resultant solution. For example, the silicon precursor may include tetraethylorthosilicate (TEOS), the solvent may include ethanol, and the reducing agent may include ammonia water. In contrast, the base particle 100 may include at least one of a silica nanoparticle and a porous silica nanoparticle.

The base particle 100 may include a functional group provided on a surface of the base particle 100. The functional group may react with the metal contained in the precursor solution. Accordingly, a metal layer including the metal may be easily formed on the base particle 100 as described below. For example, the functional group may include a thiol group. In this case, providing the functional group onto the surface of the base particle 100 may include dispersing the base particle 100 in a solvent, and adding a source material of the functional group and a reducing agent into the solvent and stirring the resultant solution. For example, the solvent may include ethanol, the source material may include (3-mercaptopropyl)trimethoxy silane (MPTS), and the reducing agent may include ammonia water.

A mixed solution may be prepared by mixing the precursor solution and the base particle 100 (S120).

According to one embodiment, the base precursor solution and the base particle 100 may be further mixed with a dispersion stabilizer. The base particle 100 may be easily and evenly dispersed in the precursor solution through the dispersion stabilizer. For example, the dispersion stabilizer may include PVP. Alternatively, as another example, the dispersion stabilizer may include at least one of PVP and PVA.

As described above, if the dispersion stabilizer is mixed together with the precursor solution and the base particle 100, according to one embodiment, the mixed solution may be prepared by adding the dispersion stabilizer into a solvent (for example, ethylene glycol), followed by adding the base particle 100 and the precursor solution into the resultant solution.

The reducing agent may be added into the mixed solution (S130). For example, the reducing agent may include organic amine, specifically octylamine. As another example, the reducing agent may include at least one of alkylamine and arylamine.

A composite particle 130 may be prepared by adding a source of a marker into the mixed solution, to which the reducing agent is added, and stirring the resultant solution (S140). In other words, the source of the marker may be added into the mixed solution, to which the reducing agent is added.

The composite particle 130 may include the base particle 100, a metal layer 110 encompassing the base particle 100, and a marker 120 provided on the metal layer 110.

The metal layer 110 may be formed of the metal which is contained in the precursor solution. The metal layer 110 may be formed as particles including the metal are bound onto a surface of the base particle 100. Accordingly, the metal layer 110 may include a plurality of convex portions protruding from the surface of the base particle 100.

Further, a plurality of gaps 115 may be provided onto a surface of the metal layer 110. The plurality of gaps 115 may extend toward the surface of the base particle 100 between the plurality of convex portions of the metal layer 110.

According to one embodiment, the plurality of gaps 115 may be narrowed as the gaps are close to the surface of the base particle 100.

According to one embodiment, an average width of the plurality of gaps 115 may be 2 nm.

Further, according to one embodiment, a floor surface of at least a part of the plurality of gaps 115 may be a surface of the base particle 100. In other words, at least a part of the plurality of gaps 115 may extend up to the surface of the base particle 100. Accordingly, the surface of the base particle 100 may form a floor surface of at least a part of the plurality of gaps 115 and may be exposed.

A size and shape of the plurality of convex portions may be controlled depending on a content of the dispersion stabilizer in the mixed solution. Accordingly, the number of the plurality of gaps 115 provided between the plurality of convex portions may be controlled depending on the content of the dispersion stabilizer. Specifically, if the content of the dispersion stabilizer is increased, the size of the plurality of convex portions may be decreased and the number of the plurality of convex portions may be increased, so as to increase the number of the plurality of gaps 115 provided between the plurality of convex portions. In contrast, if the content of the dispersion stabilizer is decreased, the size of the plurality of convex portions may be increased and the number of the plurality of convex portions may be decreased, so as to decrease the number of the plurality of gaps 115 provided between the plurality of convex portions.

The marker 120 may be provided onto the metal layer 110. Specifically, the marker 120 may be provided onto the plurality of convex portions of the metal layer 110 and may be provided within the plurality of gaps 115. The marker 120 may be provided in a form of layer as shown in FIG. 3, or may be provided in a form of island while being spaced apart from each other as shown in FIG. 4.

The marker 120 may include a Raman marker. For example, the marker 120 may include a thiol group. Alternatively, as another example, the marker 120 may include at least one of a thiol group and an amine group.

As the marker 120 is provided not only onto the plurality of convex portions of the metal layer 110, but also within the plurality of gaps 115, an adhesive force between the marker 120 and the metal layer 110 may be enhanced, and thus the marker 120 may be stably provided onto the metal layer 110. Accordingly, the signal stability and service life properties of the composite particle 130 may be enhanced.

Further, as the plurality of gaps 115 are provided onto the surface of the metal layer 110, a surface area of the metal layer 110 may be increased. Accordingly, an amount of the marker 120, which binds to the metal layer 110, may be increased to enhance the reliability and sensitivity of the composite particle 130.

According to an embodiment of the present invention, the composite particle 130 may be prepared by a method of adding the reducing agent and the source of the marker into the mixed solution, in which the precursor solution and the base particle 100 are mixed, and by mixing the resultant solution. Accordingly, the plurality of gaps 115 may be formed on the surface of the metal layer 110, and the marker 120 may be provided within the plurality of gaps 115.

Unlike the embodiment of the present invention described above, if the marker 120 is provided after forming the metal layer 110 on the base particle 100, the metal layer 110 may not have the plurality of gaps 115 and the marker 120 may not be provided within the plurality of gaps 115.

As described above, however, according to an embodiment of the present invention, the metal layer 110 and the marker 120 may not be formed through separate processes, but may be simultaneously formed through a single process. In other words, a polymer, in which the marker 120 binds to the metal contained in the precursor solution, may be produced (for example, if the metal is Ag and the marker is a thiol group, Ag-thiolate polymer may be produced), and the polymer may be introduced onto the surface of the base particle 100, so that the metal layer 110 may have the plurality of gaps 115 and the marker 120 may be provided within the plurality of gaps 115. Accordingly, there may be provided a composite particle with improved signal sensitivity, service life and stability and a method for preparing the same.

Hereinafter, specific experimental embodiments will be described with regard to the composite particle according to an embodiment of the present invention and the method for preparing the same.

Preparing of Base Particle

A silica particle was prepared as a base particle.

Specifically, tetraethylorthosilicate (TEOS, 1.6 mL) was dissolved in 40 ml of ethanol and 3 ml of ammonia water (27%) was added thereto. After that, the resultant solution was stirred with a magnetic bar for 20 hours at the room temperature to prepare silica particles. The silica particles were obtained via centrifugation and washed with ethanol.

A functional group was bound to the silica particles. Specifically, 300 mg of the silica particles were dispersed in 6 ml of ethanol containing 30 μL of MPTS and 60 μL of ammonia water (27%). After that, the resultant solution was stirred for 12 hours at the room temperature to prepare the silica particles functionalized with a thiol group. The silica particles were obtained via centrifugation and washed with ethanol.

Preparing of Composite Particle According to Example 1

A composite particle according to an embodiment of the present invention was prepared by using the silica particle prepared by the method as described above. Specifically, PVP was prepared as a dispersion stabilizer, after which $AgNO_3$ solution at a concentration of 3.5 mM was prepared as a precursor solution, and octylamine at a concentration of 5 mM was prepared as a reducing agent. 2 mg of silica particles were dispersed in 25 mL of ethylene glycol containing 5 mg of PVP, and 25 mL of $AgNO_3$ solution was added into the resultant solution. After that, 41.3 μL of octylamine was quickly added into the resultant solution. In one minute later, 4-fluoro benzenethiol (4-FBT), which is a Raman marker, was added into the resultant solution and stirred for one hour so as to prepare a composite particle according to Example 1, which includes a silica particle, an Ag layer encompassing the silica particle, and the Raman marker on the Ag layer. The composite particle according to Example 1 was obtained via centrifugation and washed with ethanol.

Preparing of Composite Particle According to Example 2

A composite particle was prepared by the method according to Example 1 as described above, but 4-amino benzenethiol was used as the Raman marker to prepare a composite particle according to Example 2.

Preparing of Composite Particle According to Example 3

A composite particle was prepared by the method according to Example 1 as described above, but 4-carboxy benzenethiol was used as the Raman marker to prepare a composite particle according to Example 3.

Preparing of Composite Particle According to Example 4

A composite particle was prepared by the method according to Example 1 as described above, but benzenethiol was used as the Raman marker to prepare a composite particle according to Example 2.

Preparing of Composite Particle According to Comparative Example 1

A composite particle was prepared by the method according to Example 1 as described above, but an Ag layer was formed on the silica particle, followed by forming the Raman marker on the Ag layer.

Specifically, 2 mg of silica particles were dispersed in 25 mL of ethylene glycol containing 5 mg of PVP, and 25 mL of $AgNO_3$ solution was added into the resultant solution. After that, 41.3 μL of octylamine was added into the resultant solution and stirred to prepare a particle in which the Ag layer was formed on the silica particle. After obtaining the particles through centrifugation, the prepared particles and 4-fluoro benzenethiol (4-FBT), which is the Raman marker, were added into ethanol and stirred to prepare a composite particle according to Comparative Example 1, in which the Raman marker is provided onto the Ag layer.

The composite particles according to Examples 1 to 4 and Comparative Example 1 may be summarized as shown in the following Table 1.

TABLE 1

| Classification | Type of Raman marker | Time point of adding Raman marker |
|---|---|---|
| Example 1 | 4-fluoro benzenethiol | Injected into mixed solution |
| Example 2 | 4-amino benzenethiol | Injected into mixed solution |
| Example 3 | 4-carboxy benzenethiol | Injected into mixed solution |
| Example 4 | benzenethiol | Injected into mixed solution |
| Comparative Example 1 | 4-fluoro benzenethiol | Separately injected after preparing particles |

Figure 5:
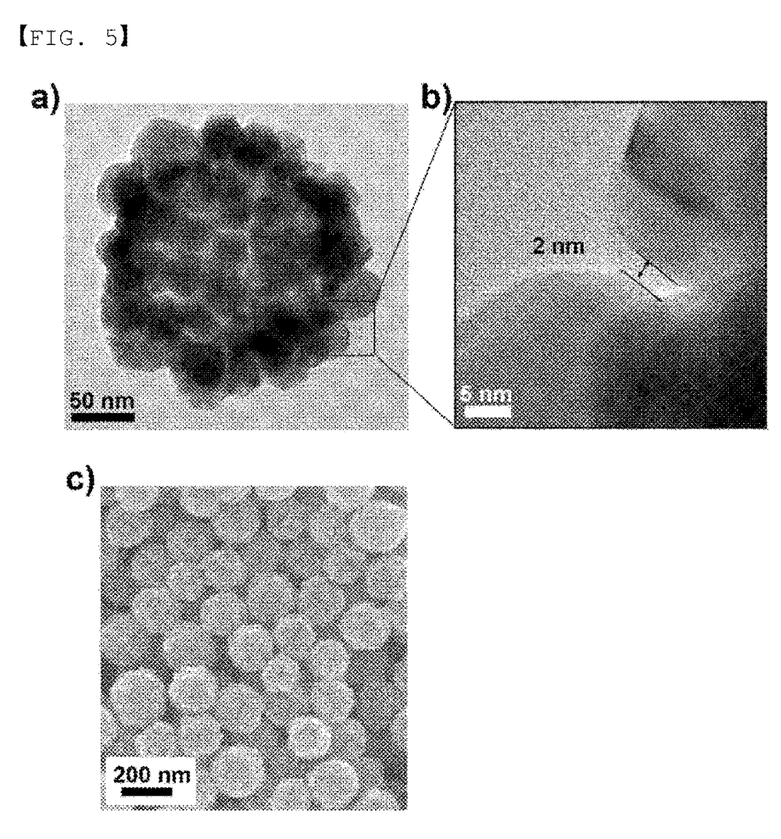
FIG. 5 is a view showing TEM pictures of composite particles according to Example 1 of the present invention.

FIG. 5 is a view showing TEM pictures of composite particles according to Example 1 of the present invention.

Referring to FIG. 5, TEM pictures and SEM pictures of composite particles according to Example 1 were photographed. It may be confirmed that the Ag layer has a plurality of convex portions and a plurality of gaps are formed between the plurality of convex portions. A width of the plurality of gaps was measured to be about 2 nm and it may be seen that the width is substantially uniform. Further, it may be confirmed that a size of composite particles is also substantially uniform.

In SERS, a Raman signal may be enhanced depending on existence of gaps. In particular, if the width of gaps is 2 nm, an effect of enhancing SERS may be remarkably improved.

Figure 6:
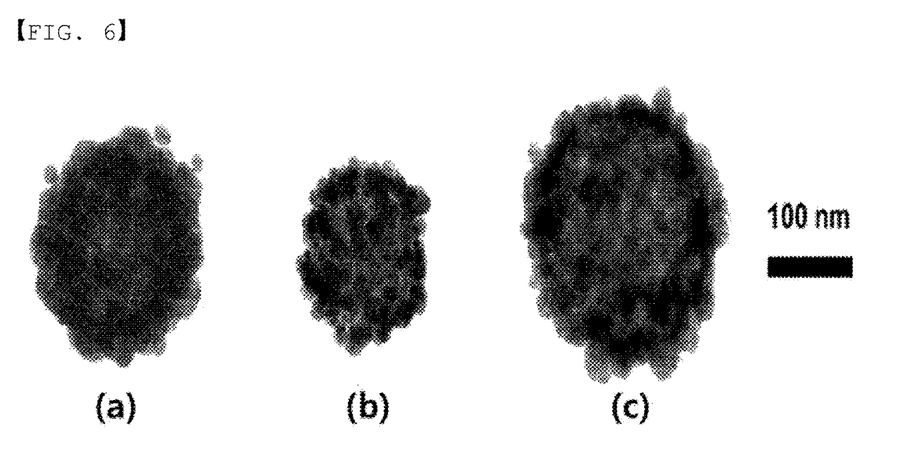
FIG. 6 is a view showing SEM pictures of composite particles according to Examples 2 to 4 of the present invention.

FIG. 6 is a view showing SEM pictures of composite particles according to Examples 2 to 4 of the present invention.

Referring to FIG. 6, SEM pictures of composite particles according to Examples 2 to 4 were photographed. In FIG. 6, (a), (b) and (c) are SEM pictures of composite particles according to Examples 2 to 4, respectively.

In Examples 2 to 4, a benzenethiol derivative having one simple aromatic ring was commonly used as the Raman marker. Specifically, 4-amino benzenethiol, 4-carboxy benzenethiol and benzenethiol were used respectively. As can be understood from FIG. 6, it may be confirmed that a size of gaps formed on the Ag layer varies depending on a type of the Raman marker. In other words, the size of gaps formed on the Ag layer may be controlled by a simple method of controlling the type of the Raman marker, thereby providing a composite particle optimized for application.

Figure 7:
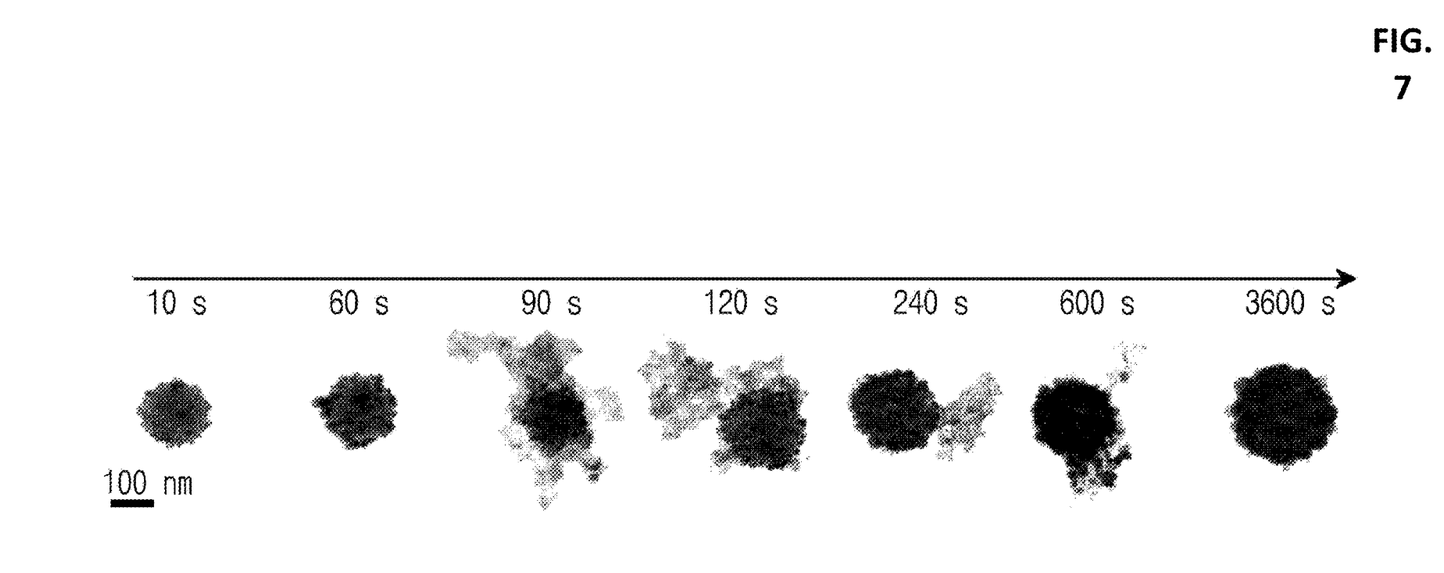
FIG. 7 is a view showing pictures of a composite particle photographed in accordance with reaction time according to Example 1 of the present invention.
Figure 8:
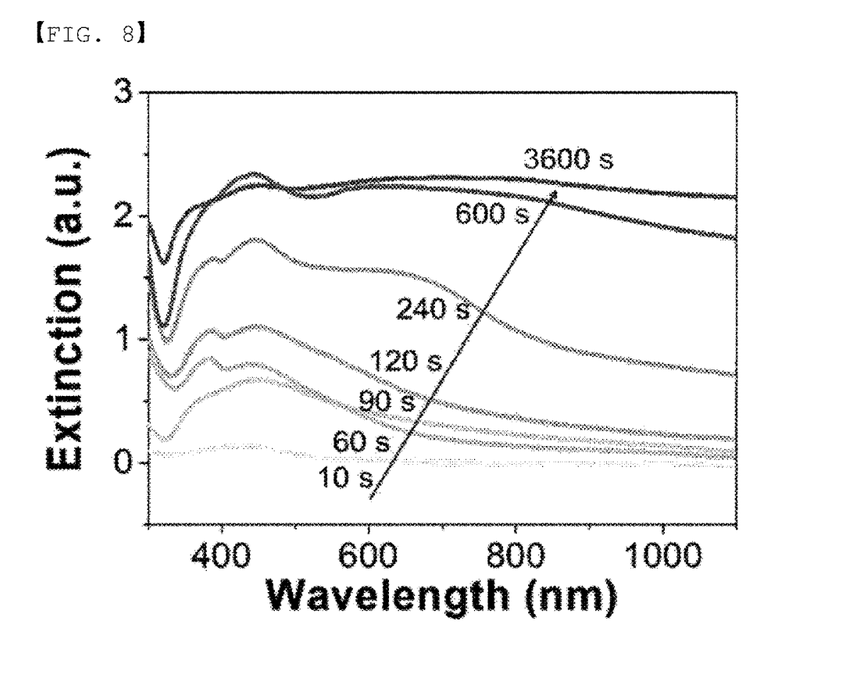
FIG. 8 is a graph showing an extinction spectrum of a composite particle measured in accordance with reaction time according to Example 1 of the present invention.
Figure 9:
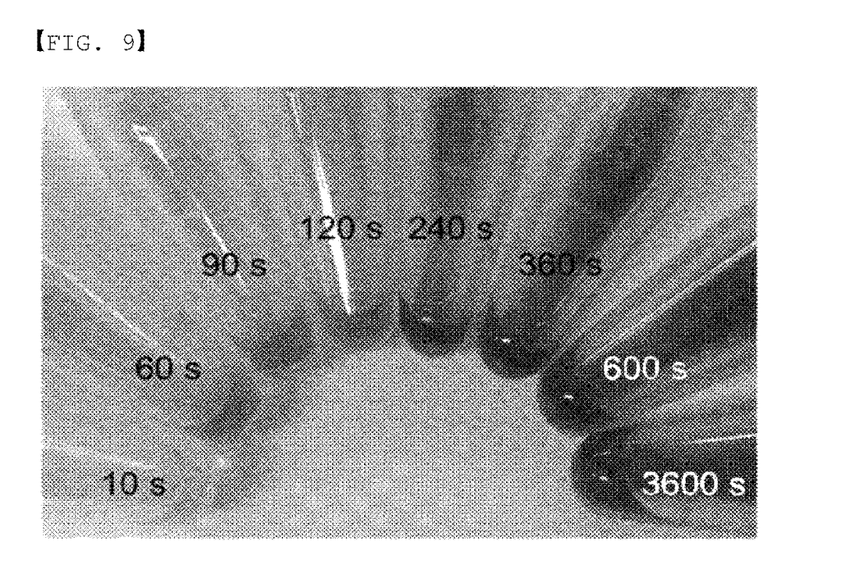
FIG. 9 is a view showing a picture of a mixed solution used in a process of preparing a composite particle according to Example 1 of the present invention.

FIG. 7 is a view showing pictures of a composite particle photographed in accordance with reaction time according to Example 1 of the present invention, FIG. 8 is a graph showing an extinction spectrum of a composite particle measured in accordance with reaction time according to Example 1 of the present invention, and FIG. 9 is a view showing a picture of a mixed solution used in a process of preparing a composite particle according to Example 1 of the present invention.

Referring to FIGS. 7 to 9, the Raman marker was added in a process of preparing a composite particle according to Example 1, after which the composite particle was prepared and pictures thereof were photographed while controlling reaction time to 10, 60, 90, 120, 240, 600 and 3600 seconds, followed by measuring an extinction spectrum with respect to UV.

It may be seen that an Ag particle surrounded by a chemical is produced while Ag is reduced and introduced around the silica particle with an elapse of reaction time, and the Ag surrounded by the chemical is provided onto a surface of the silica particle to form an Ag layer. Further, it may be confirmed that optical properties vary depending on reaction time, that is, a type of Ag particle introduced.

Figure 10:
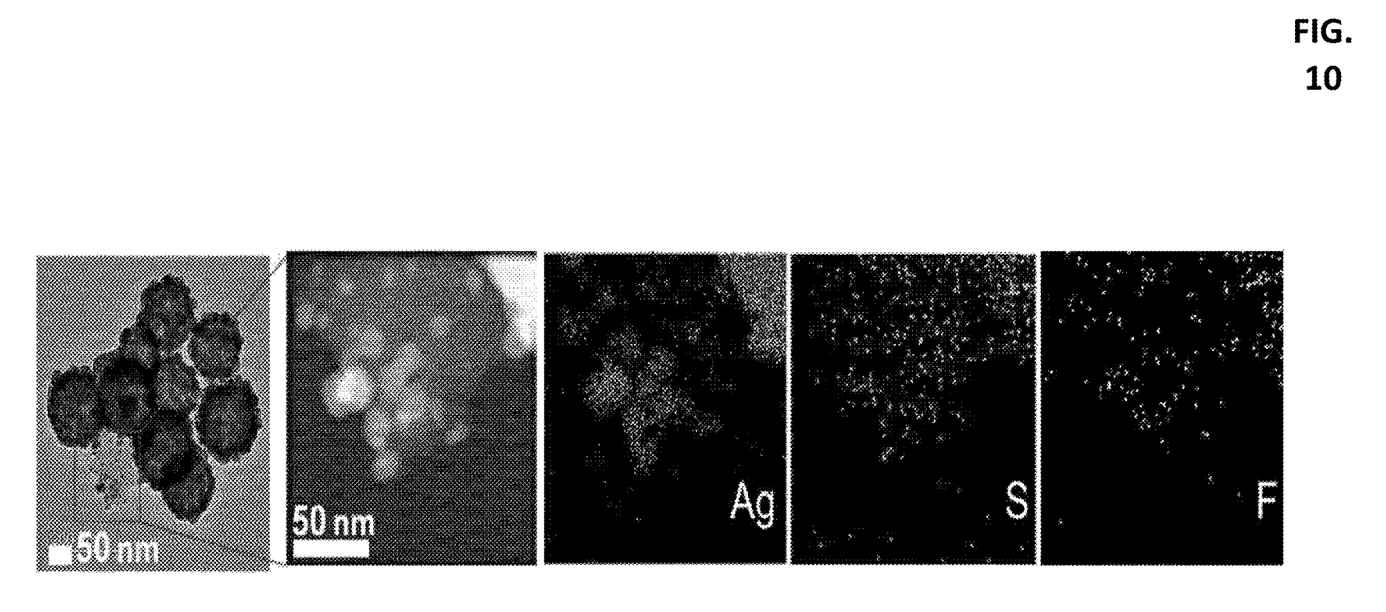
FIG. 10 is a view showing TEM pictures of a composite particle and pictures representing EDS mapping results according to Example 1 of the present invention.
Figure 11:
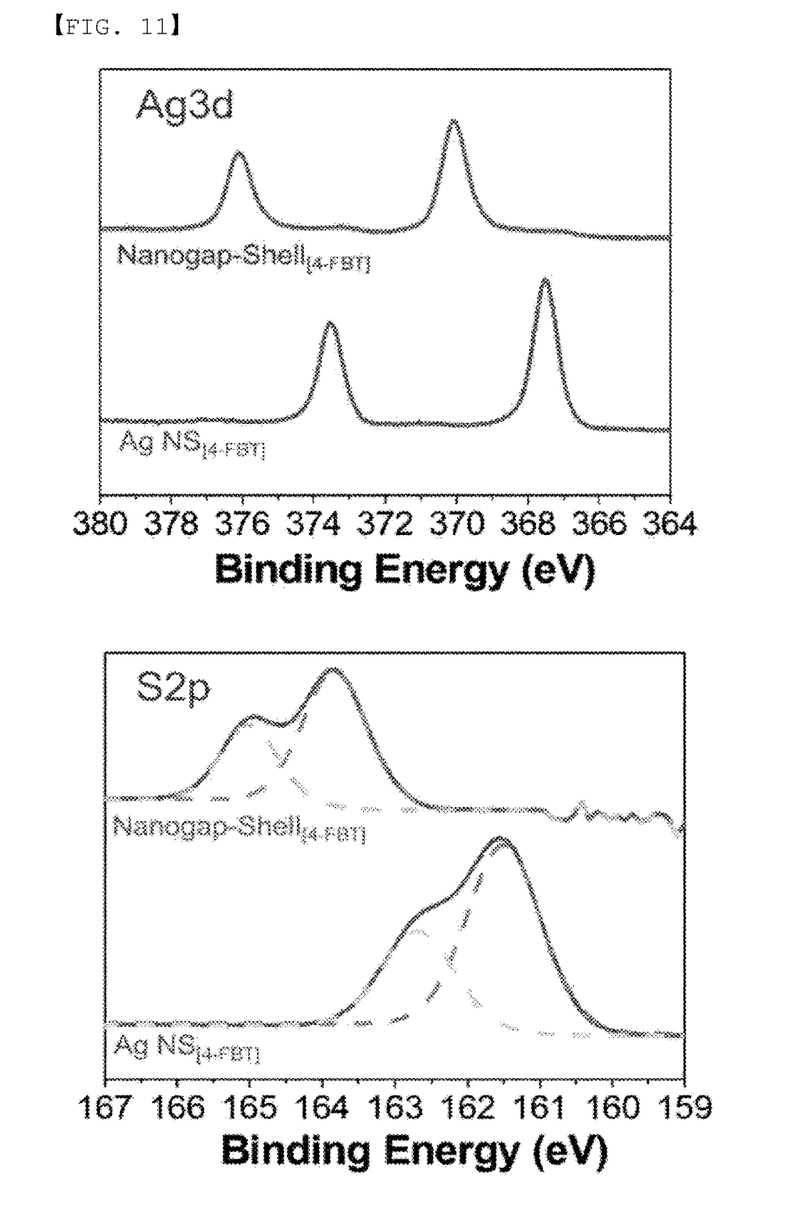
FIG. 11 is a view showing graphs representing XPS analysis results of composite particles according to Example 1 of the present invention and Comparative Example 1.

FIG. 10 is a view showing TEM pictures of a composite particle and pictures representing EDS mapping results according to Example 1 of the present invention, and FIG. 11 is a view showing graphs representing XPS analysis results of composite particles according to Example 1 of the present invention and Comparative Example 1.

Referring to FIGS. 10 and 11, TEM pictures of the composite particle according to Example 1 were photographed to analyze EDS mapping results and carry out an XPS analysis.

As can be understood from FIG. 10, it may be confirmed that S and F produced from the Raman marker of a thiol group are detected around the Ag particle. Further, as can be understood from FIG. 11, in case of the composite particle (Ag NS) according to Comparative Example 1, a binding energy between Ag and sulfur (S) generally occurs to an Ag—S binding site. On the other hand, in case of a composite particle (nanogap-shell) according to Example 1, the binding energy between Ag and S occurs to an observed area in an Ag-thiolate polymer structure. It can be understood that the Ag surrounded by the chemical described with reference to FIGS. 7 to 9 is Ag thiolate polymer, and it may be confirmed that the Ag thiolate polymer is provided onto a surface of a silica particle, so as to prepare a composite particle which has an Ag layer having a plurality of gaps and a Raman marker provided within the plurality of gaps.

Figure 12:
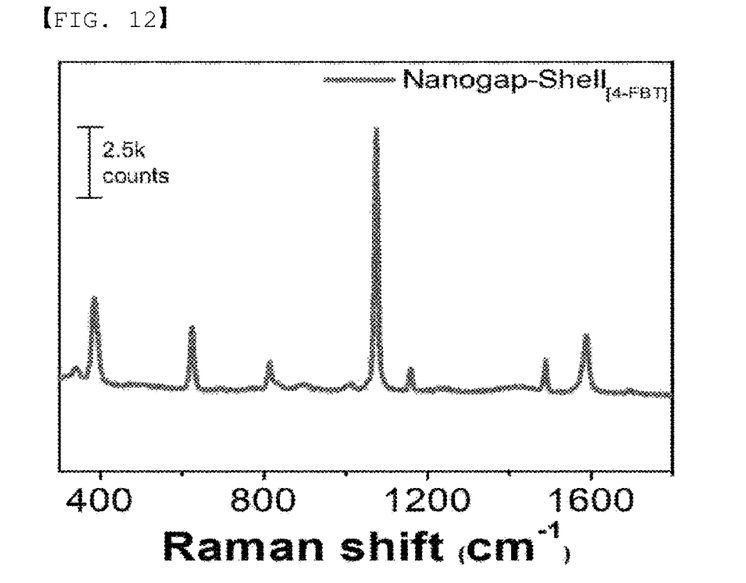
FIG. 12 is a graph showing a Raman spectrum analysis of a composite particle according to Example 1 of the present invention.
Figure 13:
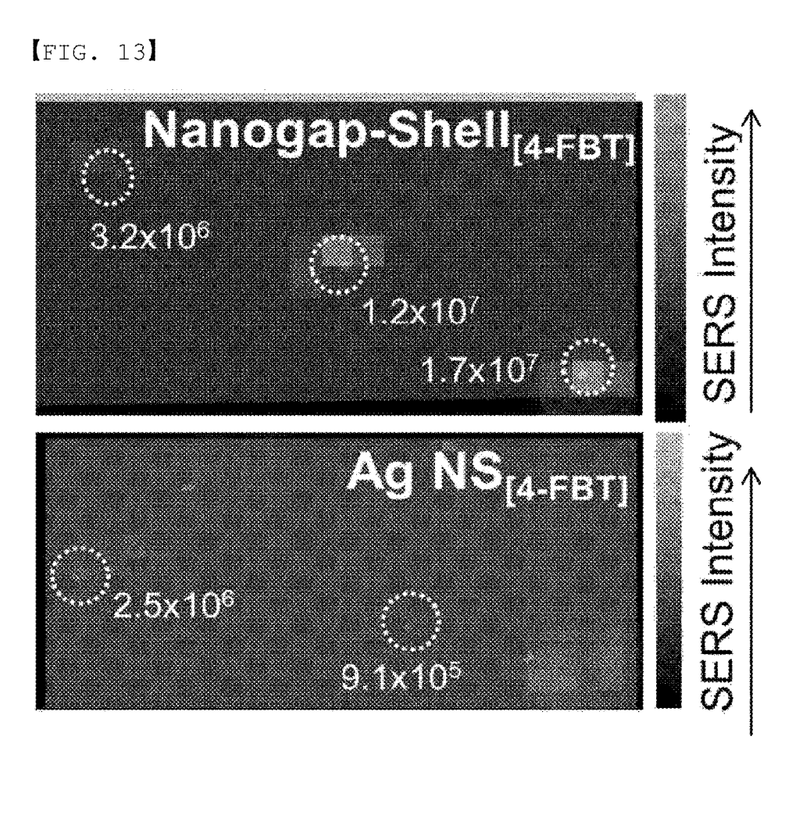
FIG. 13 is a view showing pictures for comparing SERS signal intensities of composite particles according to Example 1 of the present invention and Comparative Example 1.
Figure 14:
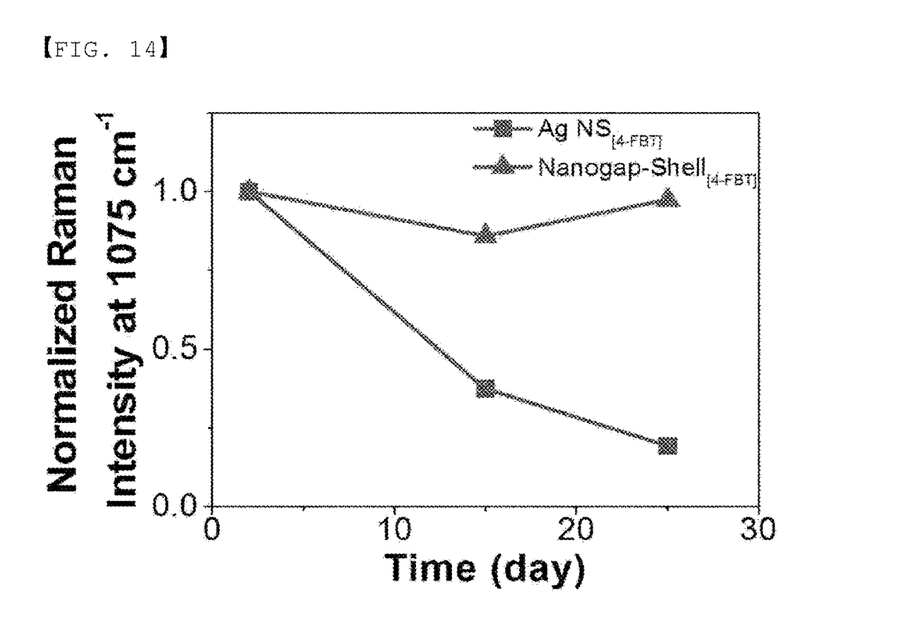
FIG. 14 is a graph for comparing normalized Raman intensities of composite particles according to Example 1 of the present invention and Comparative Example 1 at 1075 $cm^{-1}$.

FIG. 12 is a graph showing a Raman spectrum analysis of a composite particle according to Example 1 of the present invention, FIG. 13 is a view showing pictures for comparing SERS signal intensities of composite particles according to Example 1 of the present invention and Comparative Example 1, and FIG. is a graph for comparing normalized Raman intensities of composite particles according to Example 1 of the present invention and Comparative Example 1 at 1075 $cm^{-1}$.

Referring to FIG. 12, a Raman spectrum of the composite particles according to Example 1 and Comparative Example 1 was measured. As can be understood from FIG. 12, it may be confirmed that a signal of 4-FBT, which is a Raman marker, is strongly represented.

Referring to FIG. 13, an SERS enhancement factor of the composite particles according to Example 1 and Comparative Example 1 was measured and analyzed at a level of single particle. In FIG. 13, a circle in a white dotted line represents a single particle, and a value below the white dotted line is an enhancement factor value. It may be confirmed that an enhancement factor value of the composite particle according to Example 1 is at least about ten times higher than that of the composite particle according to Comparative Example 1.

Referring to FIG. 14, the composite particles according to Example 1 and Comparative Example 1 were stored at the room temperature and signal stabilities thereof were compared with each other at a level of single particle. As can be understood from FIG. 14, the composite particle according to Comparative Example 1 showed a drastic decrease in signal, but the composite particle according to Example 1 maintained a high signal for a long period of time. In other words, in case of the composite particle according to Comparative Example 1, in which the Raman marker is introduced only onto a surface of the Ag layer, it is confirmed that the Raman marker attached onto the Ag layer may fall off therefrom to decrease stability. In contrast, in case of the composite particle according to Example 1, it may be confirmed that the Raman marker is provided in a form of being inserted within the plurality of gaps formed on the surface of the Ag layer, so that the Raman marker stably binds to the Ag layer.

Although the present invention has been described in detail with reference to exemplary embodiments, the scope of the present invention is not limited to a specific embodiment and should be interpreted by the attached claims. In addition, those skilled in the art should understand that many modifications and variations are possible without departing from the scope of the present invention.

INDUSTRIAL APPLICABILITY

A composite particle according to an embodiment of the present invention may have high signal stability and high sensitivity and have specific optical properties, and thus may be applied not only to diagnosis and exploration of diseases, but also detection of various materials.

The invention claimed is:

1. A composite particle comprising:
   a base particle;
   a metal layer enclosing the base particle and having a surface on which a plurality of gaps are formed, wherein the surface of the metal layer has a plurality of convex portions, wherein the gaps are located between the convex portions of the metal layer, and wherein the gaps have sidewall surfaces and a bottom surface; and
   a marker provided on the metal layer and provided within the plurality of gaps of the metal layer, wherein the marker is provided on the bottom surface of the gaps;
   wherein the metal layer and the marker are formed from a Ag thiolate polymer provided on a surface of the base particle.

2. The composite particle of claim 1, wherein the metal layer is positioned between the surface of the base particle and the bottom surface of the gaps.

3. The composite particle of claim 1, wherein the marker comprises a Raman marker.

4. The composite particle of claim 1, wherein the base particle comprises a silica particle.

5. The composite particle of claim 1, wherein the plurality of gaps are narrower at a point that is closer to the surface of the base particle as compared to at a point that is further from the surface of the base particle.

6. A method for preparing the composite particle of claim 1, the method comprising:
   preparing a precursor solution containing Ag, and the base particle;
   mixing the precursor solution and the base particle to prepare a mixed solution;
   adding a reducing agent into the mixed solution; and
   adding a source of the marker into the mixed solution, to which the reducing agent is added, and stirring a resultant solution to prepare the composite particle.

7. The method of claim 6, wherein preparing the mixed solution comprises mixing the precursor solution and the base particle with a dispersion stabilizer.

8. The method of claim 7, wherein a size and number of the plurality of convex portions are controlled depending on a content of the dispersion stabilizer.

9. The method of claim 8, wherein, when the content of the dispersion stabilizer is increased, the size of the plurality of convex portions is decreased and the number of the plurality of convex portions is increased, so as to increase a number of the plurality of gaps provided between the plurality of convex portions.

10. The method of claim 7, wherein a number of the plurality of gaps is controlled depending on a content of the dispersion stabilizer.

11. The method of claim 7, wherein the dispersion stabilizer comprises PVP.

12. The method of claim 6, wherein the base particle comprises a functional group which is provided on the surface of the base particle and reacts with the Ag.

* * * * *